United States Patent [19]

Kawai

[11] Patent Number: 5,153,720
[45] Date of Patent: Oct. 6, 1992

[54] MOTION IMAGE DIFFERENCE DETECTING APPARATUS

[75] Inventor: Toshihiko Kawai, Tokyo, Japan
[73] Assignee: Sony Corporation, Tokyo, Japan
[21] Appl. No.: 726,853
[22] Filed: Jul. 8, 1991
[30] Foreign Application Priority Data
  Jul. 9, 1990 [JP] Japan ............... 2-179694
[51] Int. Cl.$^5$ ............................... H04N 1/40
[52] U.S. Cl. .......................... 358/105; 358/85
[58] Field of Search ...................... 358/105, 85
[56] References Cited
  U.S. PATENT DOCUMENTS
  4,096,525 6/1978 Lathan ................... 358/105
  4,272,787 6/1981 Michael ................. 358/105

Primary Examiner—Howard W. Britton
Attorney, Agent, or Firm—Philip M. Shaw, Jr.

[57] ABSTRACT

In, for example, a teleconference system, a motion image difference detecting apparatus comprises a first memory (8) for storing first data of a motion image signal corresponding to a first area obtained by dividing the motion image signal, a second memory (12) for storing second data of the motion image signal corresponding to a second area obtained by so dividing the motion image signal, an overlap area of the motion image signal where the first and second areas meet being stored in each of the memories (8, 12), a memory controller (2) for controlling each of the memories (8, 12) so as to store thereinto the image signal of the overlap area, and a detector (6, 10) for detecting a difference between the present frame image and the preceding frame image in the form of block units.

6 Claims, 5 Drawing Sheets

MOTION IMAGE DIFFERENCE DETECTING APPARATUS

This invention relates to motion image difference detecting apparatus.

With known teleconference systems, it is difficult to transmit all the required motion image signals within the time duration of a single frame, because there are too many such signals. However, if motion image signals are transmitted at intervals, or are subjected to a compression process such as by dropping some of the signals, the motion image quality and the responsiveness suffer. To overcome this problem, a number of high-efficiency coding methods have been proposed.

One proposed method which has proved effective is the motion compensating inter-frame coding method. This method involves detecting image motion between contiguous frames, and correcting the amount of motion using inter-frame prediction. What is critically important in this method is the detection of motion components within motion images (that is, images between which there is relative motion) accurately and efficiently. A number of variations of the method have been proposed to improve the capability to meet the above requirement.

One variation is the so-called block matching method which is known for its high accuracy in detecting motion components within motion images. This method involves dividing a picture area into a plurality of blocks and, on the assumption that a given motion is parallel to each of the blocks, detecting for each block a motion vector corresponding to the amount of motion shift which gives the best inter-frame correlation.

FIG. 6 is a block diagram of a known motion vector detecting apparatus using a block matching method, and FIG. 7 is a view showing how a motion vector is detected with this apparatus. In FIG. 6, a frame memory (FMA) 300 stores the motion images of the currently scanned frame, for example, 288×352 pixels of motion image data. Each pixel may be represented as luminance data using eight bits. Another frame memory (FMB) 302 has the same capacity as the FMA 300 and stores the motion image data of the preceding frame. A motion vector detection processor (MEP) 200 successively compares the motion image data in the FMA 300 with those in the FMB 302, in units of a motion image detection unit block 500 (FIG. 7) for the FMA 300, and a motion image detection unit block 502 for the FMB 302, thereby detecting the difference between the two sets of image data. That is, the MEP 200 compares image data M1 and M2 inside the 16×16 pixel unit blocks 500 and 502 around (above and below; left and right of) centres Ca and Cb at which the motion vector within the FMA 300 and the FMB 302 is to be detected. If any difference is detected between M1 and M2, that difference is expressed as a motion vector. The above operation is carried out on all pictures. The motion vector detected by the MEP 200 is coded before being transmitted to the receiving side. After the motion vector detection process, the motion image data stored in the FMA 300 are transmitted successively to the FMB 302.

In the above-described process which performs "full search" for image data of each picture, one picture may, for example, comprise 288×352 pixels, and the motion image detection unit block may be 16×16 pixels. In this case, processing each picture at say 30 Hz requires performing the motion vector detection process within 84 μs per unit block (of 256 pixels). That means there is the need for an MEP 200, an FMA 300 and an FMB 302 capable of operating at high speeds.

One method which has been proposed for reducing the processing time uses a multistage motion vector detection algorithm that reduces the number of operations (see, "Motion Compensating Inter-frame Coding for Teleconference TV Signals," Koyasu et al; Shingaku-Giho, IE81-54, pages 85 to 90, 1981). As an example; the above-mentioned full search operation needs to be performed 65,536 times on 256×256 pixels. Where a three-stage motion vector detection algorithm is applied, the operation count drops to 6,912. However, in a set-up where the frame memory is implemented using a DRAM whose access speed is about 50 ns, it takes as long as 345 μs to perform the memory access process involved. This means that high-speed processing is still required.

This bottleneck is associated with the frame memory structure. One way to circumvent this difficulty is to set up a plurality of frame memory arrangements. As shown in FIG. 8, two or four frame memory arrangements may be provided for parallel processing. In FIG. 8, frame memories (FM1A and FM2A) 304 and 308 store the same motion images of the current frame, while frame memories (FM1B and FM2B) 306 and 310 store the same motion images of the preceding frame. An upper-stage motion vector detection processor (MEP1) 202 detects a motion vector of the upper half of a picture, while a lower-stage motion vector detection processor (MEP2) 204 detects a motion vector of the lower half of the picture. So that motion vector detection may be performed continuously in the divided area of the picture centre, the frame memories 304, 306, 308 and 310 store all images; and the two motion vector detection processors 202 and 204 also detect a motion vector of an overlap area centring on the divided picture area.

However, in the set-up of FIG. 8, each of the frame memories requires a memory capacity equivalent to the motion image data of one picture, for example, 524,288 bits (=256×256×8). Overall, a frame memory capacity for accommodating four pictures of image data needs to be provided.

If the system is further multiplexed in construction, the above-described memory and processor set-ups and their related parts must be expanded accordingly.

According to the present invention there is provided a motion image difference detecting apparatus comprising:
first memory means for storing first data of a motion image signal corresponding to a first area obtained by dividing said motion image signal;
second memory means for storing second data of said motion image signal corresponding to a second area obtained by so dividing said motion image signal, an overlap area of said motion image signal where said first and second areas meet being stored in each of said memory means, said two memory means being independent of each other;
a memory controller for controlling each of said memory means so as to store thereinto the image signal of said overlap area including the boundary line where said first and second areas meet; and
detecting means connected to said memory means for detecting a difference between the present frame image and the preceding frame image based on each predetermined area of the image in the form of block units for processing said motion image signal stored in each of said memory means.

Embodiments of the invention can permit higher speed processing without a requirement for excessive frame memory capacity.

The invention will now be described by way of example with reference to the accompanying drawings, throughout which like parts are referred to by like references, and in which.

Figure 1:
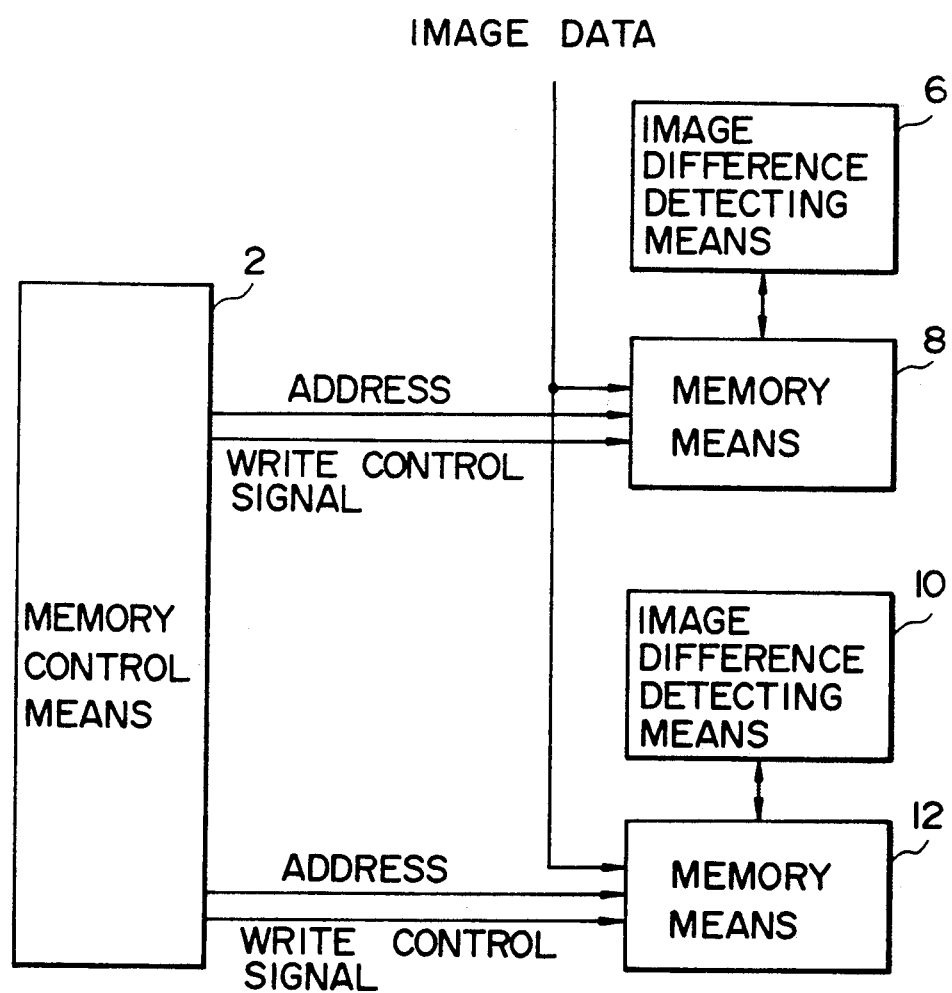
FIG. 1 is a block diagram of an embodiment of motion image difference detecting apparatus according to the present invention.
Figure 2:
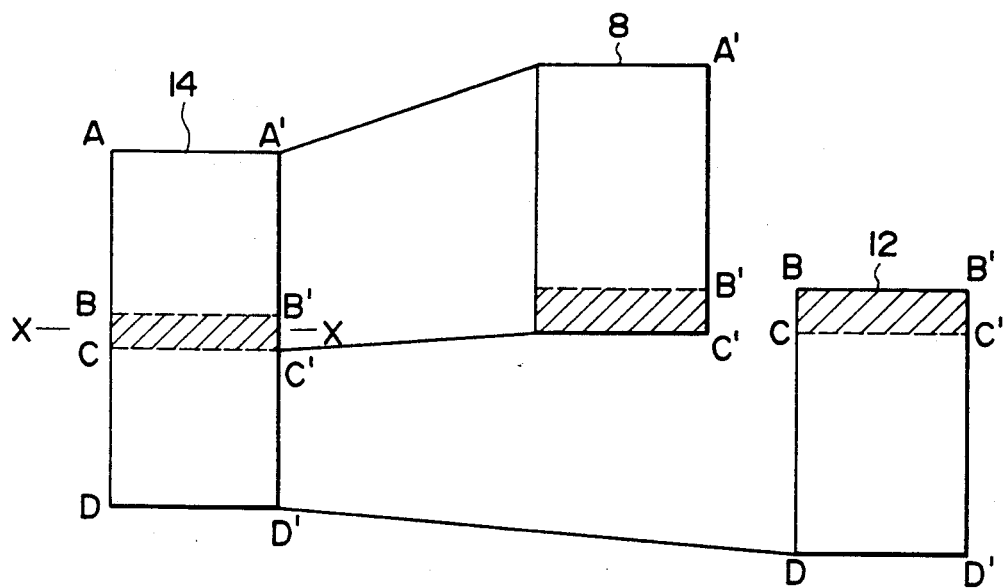
FIG. 2 is a view showing how a motion image signal is divided and stored in the embodiment of FIG. 1.

FIG. 2 shows how one picture of a motion image is constructed and how the image data are divided for storage into two memory means 8 and 12 shown in FIG. 1. The motion image of the picture 14 is divided into an upper and a lower portion centring on line X—X in the middle of the picture. The first memory means 8 stores motion image data of the area ranging from line A—A' to line C—C', the latter line being below the centre line X—X. The second memory means 12 stores motion image data of the area ranging from line B—B' to line D—D', the former line being above the centre line X—X. That is, the first memory means 8 and the second memory means 12 accommodate, in addition to half of the single picture motion image data each, the motion image data representing the overlap area enclosed by lines B—B' and C—C'. The overlap area image data are stored in both memory means 8 and 12, so that a first motion image difference detecting means 6 and a second motion image difference detecting means 10 may each detect independently the image difference continuously near the picture-dividing centre line X—X. The overlap data to be stored represent the width of a motion image detection unit block.

A memory control means 2 stores the image data of the picture 14 in the first and second memory means 8 and 12 in the format illustrated in FIG. 2. The image difference detecting means 6 and 10, acting independently of each other, detect image changes between the current and the preceding picture in units of motion image detection unit blocks in the upper and lower portions of the picture including the overlap area.

Figure 3:
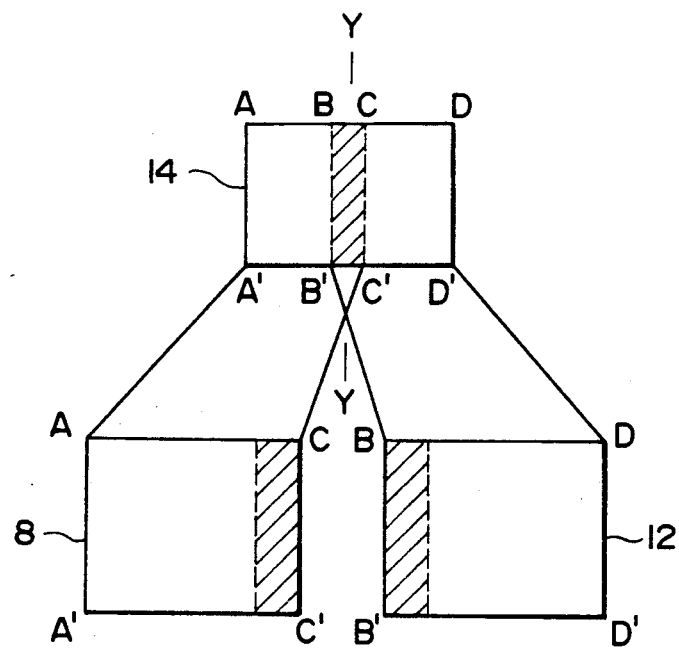
FIG. 3 is a view showing another way of dividing the motion image signal and storing the divided signal.

As an alternative to being divided into the upper and lower portions as shown in FIG. 2, the picture 14 may be divided into left and right-hand portions as shown in FIG. 3. The picture, if its pixels are not square in shape, should preferably be divided in such a way that the capacity of each memory means will be minimized.

Figure 4:
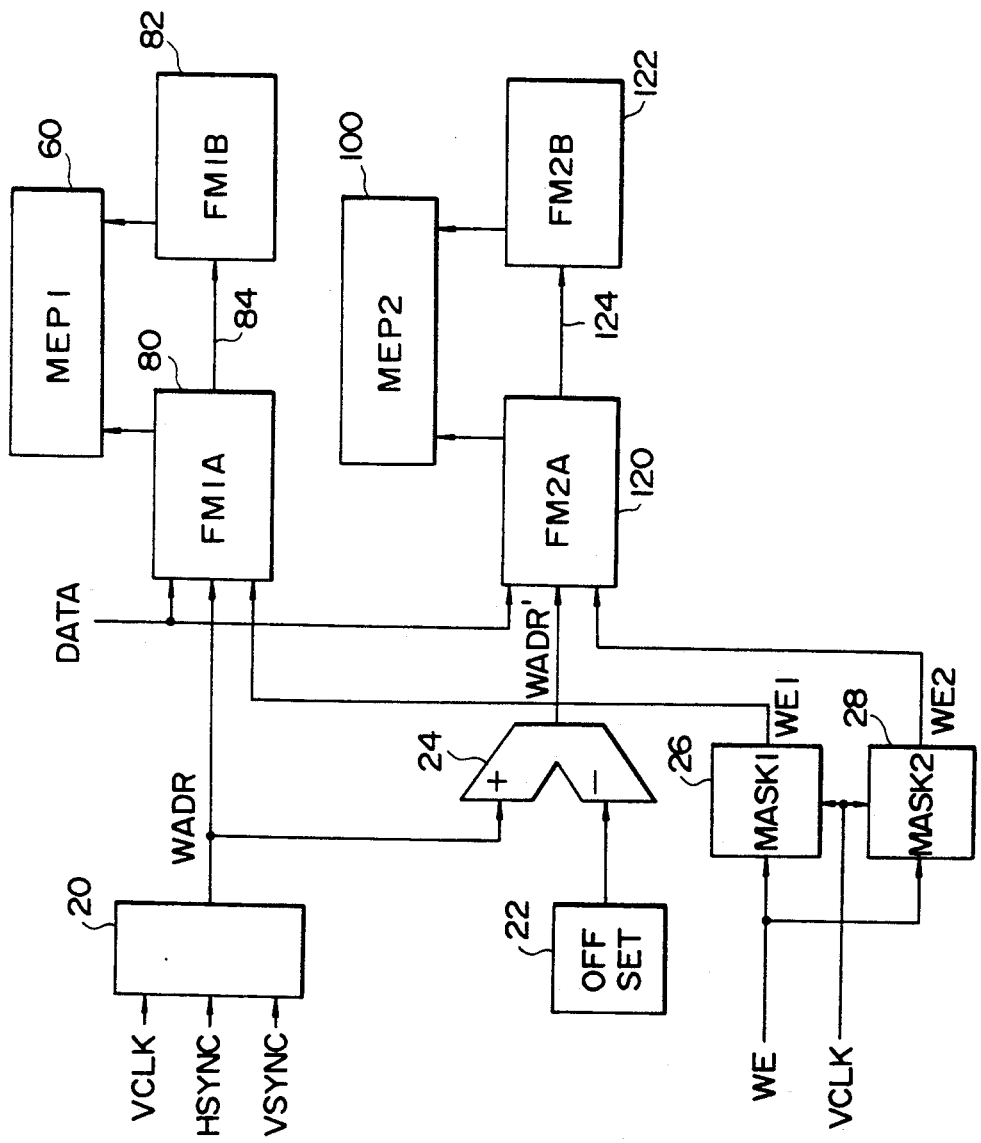
FIG. 4 is a block diagram of a modified embodiment of motion vector detecting apparatus.

FIG. 4 shows a modified form of the embodiment of FIG. 1.

Referring to FIG. 4, a counter 20, an offset register 22, a subtracter 24, a first masking circuit 26 and a second masking circuit 28 form the memory control means 2 of FIG. 1; a first motion vector detecting processor (MEP1) 60 corresponds to the first motion image difference detecting means 6 of FIG. 1; a first frame memory (FM1A) 80 for storing the current frame motion image signal, a memory bus 84 and a first frame memory (FM1B) 82 for storing the preceding frame motion image signal form the first memory means 8 of FIG. 1; a second motion vector detecting processor (MEP2) 100 corresponds to the second motion image difference detecting means 10 of FIG. 1; and a second frame memory (FM2A) 120 for storing the current frame motion image signal, a memory bus 124 and a second frame memory (FM2B) 122 for storing the preceding frame motion image signal form the second memory means of FIG. 1.

With the above embodiment, the picture is divided in the direction depicted in FIG. 2. One screen is made of 256×256 pixels, each pixel being represented by eight bits of luminance data. The current motion image detection unit block 500 (FIG. 7) and the preceding motion image detection unit block 502 each measure 16×16 pixels. Therefore the capacity of each of the frame memories 80, 82, 120 and 122 is $(128 \times 256 + 256 \times 16) \times 8$ bits $= 36,864 \times 8$ bits $= 264,912$ bits (that is, 36,864 bytes). The overlap area measures $256 \times 16 \times 8$ bits $= 4,096 \times 8$ bits $= 32,768$ bits (that is, 4,096 bytes). In other words, each of the frame memories 80, 82, 120 and 122 corresponds in capacity to half of the data for one normal picture ($256 \times 256 \times 8$ bits $= 524,288$ bits) plus the data in the overlap area.

The frame memories 80 and 120 each comprise a dual port type DRAM which makes it possible simultaneously to move image data from the memory control means 2 thereto and to the MEP1 60 and the MEP2 100 therefrom. The frame memories 82 and 122 also each comprise a dual port type DRAM making it possible simultaneously to move image data from the frame memories 80 and 120 thereto and to the MEP1 60 and the MEP2 100 therefrom.

Referring also to FIG. 2, the FM1A 80 stores the image data of the area enclosed by lines A—A' and C—C' in the picture 14, the area ranging from address 0 to address 36,863. The FM2A 120 stores the image data of the area enclosed by lines B—B' and D—D' in the picture 14, the area ranging from address 28,672 to address 65,535.

Figure 5:
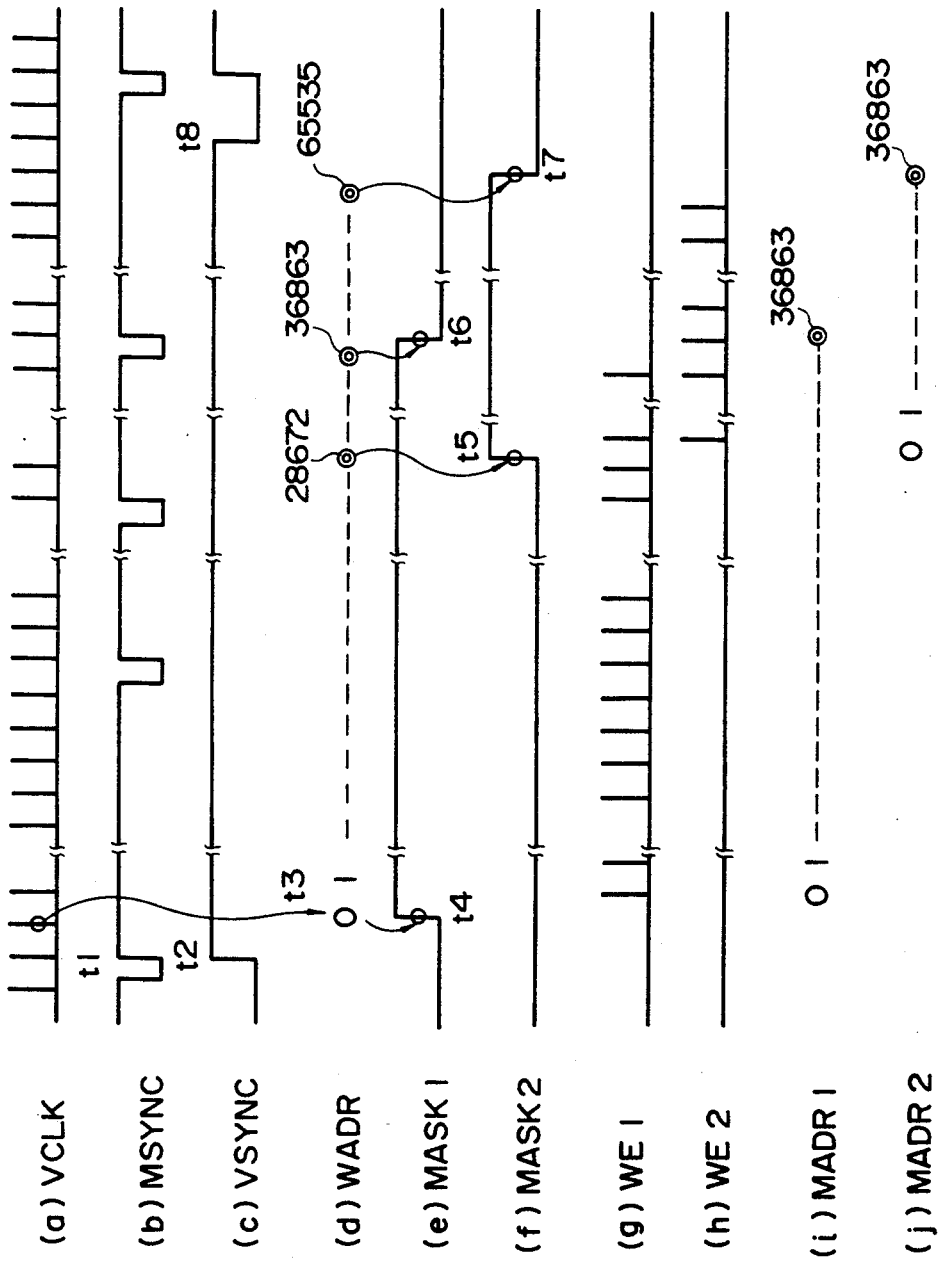
FIG. 5 is a timing chart for the apparatus of FIG. 4.
Figure 6:
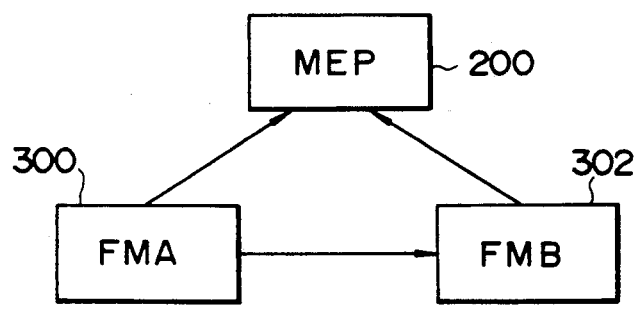
FIG. 6 is a block diagram of a known motion vector detecting apparatus.

The operation of the embodiment of FIG. 4 will now be described with reference to the timing chart of FIG. 5. With this embodiment, image data are written into and read from each of the frame memories 80, 82, 120 and 122 in units of pixels (that is, 8 bits or 1 byte).

The counter 20 receives a television picture horizontal synchronizing signal MSYNC (FIG. 5(b)), a television picture vertical synchronizing signal VSYNC (FIG. 5(c)), and a clock signal VCLK (FIG. 5(a)). The counter 20 receives the clock signal VCLK through a clock terminal, and the vertical synchronizing signal VSYNC through a reset terminal. Every time a vertical synchronizing signal VSYNC is input, the count value is reset in the counter 20; and every time a clock signal VCLK is input, the count value is incremented. The count value represents a write address WADR (covering addresses 0 to 65,535; FIG. 5(d)) for the image data of the picture 14.

The write address WADR is directly sent to the FM1A 80 and turned into a memory address MADR1 (FIG. 5(i)) for the FM1A 80. The write address WADR is also fed to the subtracter 24 through one terminal thereof. The other terminal of the subtracter 24 is supplied with an offset value (=28,672) from the offset register 22. The subtracter 24 substracts the offset value from the write address WADR and supplies the resulting write address WADR' to the FM2A 120. The write address WADR' from the substracter 24 becomes a memory address MADR2 (FIG. 5(j)) for the FM2A 120.

To enable the above write addresses WADR and WADR' for a predetermined period of time, the first masking circuit 26 and the second masking circuit 28 generate a masked first write enable signal WE1 (FIG. 5(g)) and a masked second write enable signal WE2 (FIG. 5(h)), respectively. The first masking circuit 26 receives a write enable signal WE. Except when the clock signal VCLK representing addresses 1 to 36,863 is applied following the receipt of a vertical synchronizing signal VSYNC (over time t5 to t7), the first masking circuit 26 uses a first masking signal MASK1 (FIG. 5(e)) to mask the write enable signal WE. This allows the first masking circuit 26 to output the first write enable signal WE1 to the FM1A 80. Likewise, except when the clock signal VCLK representing addresses 32,767 to 655,351 is applied following the receipt of a vertical synchronizing signal VSYNC (over time t5 to t7), the second masking circuit 28 uses a second masking signal MASK2 (FIG. 5(f)) to mask the write enable signal WE. This allows the second masking circuit 28 to output the second write enable signal WE2 to the FM2A 120.

The FM1A 80 and the FM2A 120 receive the same image data (DATA in FIG. 4). Over the time t4 to t6, the first memory address MADR1 (0 to 36,863) causes the FM1A 80 to store the image data of addresses 0 to 36,863 representing the area enclosed by lines A—A' and C—C' in the picture 14 of FIG. 2. On the other hand, over the time t5 to t7, the second memory address MADR2 (0 to 36,863) causes the FM2A 120 to store the image data of addresses 28,672 to 65,535 representing the area enclosed by lines B—B' and D—D' in the picture of FIG. 2. Over the time t5 to t6, each frame memory stores the image data of the addresses representing the area enclosed by lines B—B' and C—C' in FIG. 2. Since the partially overlapping image data between lines B—B' and C—C' are stored in the FM1A 80 and FM2A 120, the continuity of the image difference detection process is ensured. In this manner, the motion vector detection process is performed in units of motion image detection unit blocks independently and in parallel.

Figure 7:
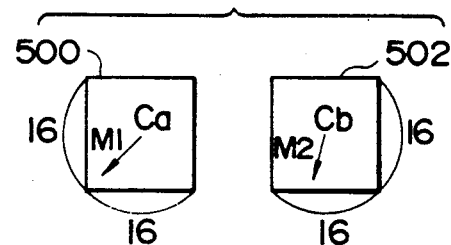
FIG. 7 is a view showing how a motion image difference is detected with the known apparatus.
Figure 8:
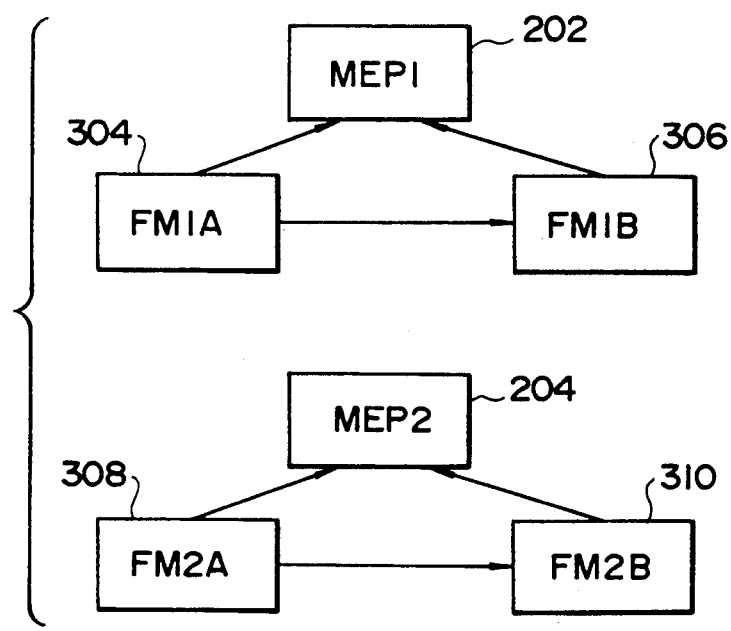
FIG. 8 is a block diagram of another known motion vector detecting apparatus.

Given the image data from the FM1A 80 and FM1B 82, the MEP1 60 successively detects changes in the motion images M1 and M2 in units corresponding to the current motion image detection unit block 500 and the preceding motion image detection unit block 502 (16×16 pixels each, shown in FIG. 7). The changes that may be detected are those in terms of image shift and gradation (luminance). If any change is detected by the MEP1 60, the coordinates of the detection centre Ca as well as the amount, direction and gradation difference of the change are represented in terms of a motion vector. Likewise, given the image data from the FM2A 120 and the FM2B 122, the MEP2 100 successively detects a motion vector in units of blocks concurrently with the MEP1 60. The MEP1 60 and the MEP2 100 each comprise a microprocessor or a DSP.

In the manner described, only the motion vector detected by the MEP1 60 and the MEP2 100 is coded in the normal way and transmitted to the receiving side.

The above-described process is repeated every time the image data of one frame is updated, for example, every 30 ms. When this process has been completed, the image data in the FM1A 80 are transferred via the second memory bus 84 to the FM1B 82. Likewise, the image data in the FM2A 120 are transferred via the memory bus 124 to the FM2B 122.

As described, the embodiment has the MEP1 60 and the MEP2 100 incorporated in parallel. Operating simultaneously, the two processors perform the task of detecting the motion image difference in the same picture. This arrangement doubles the speed of detecting the motion vector while making the total capacity of the frame memories 80, 82, 120 and 122 approximately equivalent to the image data of two pictures. Because the image data are divided for processing, image changes may be detected under time constraints of, say, 30 ms per frame without the use of a high-speed MEP1 60 or MEP2 100 or a high-speed frame memory 80, 82, 120, 122.

If the motion vector detecting system and the frame memory set-up are further multiplexed, for example, formed by four memory and processor arrangements, then the motion vector detection speed is quadrupled, but the total capacity of the frame memories remains substantially the same as that of the above embodiment, that is, equivalent to the image data of two pictures. That is, further multiplexing the system only increases the image data of the overlap area in the picture; the total capacity of the frame memories required stays approximately equivalent to the image data of two pictures.

The above embodiment, primarily associated with the detection of motion vectors, is not limitative of the present invention. The invention may also be applied to detecting simple image changes. Furthermore, the invention is not limited to teleconference system applications; it may also be applied to other systems for detecting changes between various images.

As described above, there is provided a motion image difference detecting system which divides a picture while maintaining the continuity thereof, and which stores the corresponding image data of the divided areas into frame memories with little increase in frame memory capacity, wherein image changes are processed in parallel by multiple frame and processor arrangements. This system permits high-speed detection of motion image differences without the use of a high-speed processor of frame memory set-up or a large-capacity frame memory arrangement, hence with no appreciable increase in manufacturing cost.

I claim:

1. A motion image difference detecting apparatus comprising:
   first memory means for storing first data of a motion image signal corresponding to a first area obtained by dividing said motion image signal;
   second memory means for storing second data of said motion image signal corresponding to a second area obtained by so dividing said motion image signal, an overlap area of said motion image signal where said first and second areas meet being stored in each of said first memory means and second memory means, said first memory means and second memory means being independent of each other;

a memory controller for controlling each of said first memory means and second memory means so as to store thereinto the image signal of said overlap area including the boundary line where said first and second areas meet; and detecting means connected to said first memory means and second memory means for detecting a difference between the present frame image and the preceding frame image based on each predetermined area of the image in the form of block units for processing said motion image signal stored in each of said first memory means and second memory means.

2. Apparatus according to claim 1 wherein said detecting means detects a motion condition of said motion image signal based on a block matching method using a searching area in the image to derive a motion vector.

3. Apparatus according to claim 2 wherein said motion image signal is searched by said detecting means based on said block unit.

4. Apparatus according to claim 1, claim 2 or claim 3 wherein said overlap area has the width of said block unit.

5. Apparatus according to claim 4 comprising further memory means to enable said motion image signal to be divided into more than two areas with respective overlap areas where they meet.

6. Apparatus according to claim 4 forming part of a teleconference system.

* * * * *